(12) United States Patent  
Koushanfar et al.

(10) Patent No.: US 8,370,787 B2  
(45) Date of Patent: Feb. 5, 2013

(54) TESTING SECURITY OF MAPPING FUNCTIONS

(75) Inventors: Farinaz Koushanfar, Houston, TX (US); Miodrag Potkonjak, Los Angeles, CA (US)

(73) Assignee: Empire Technology Development LLC, Wilmington, DE (US)

(*) Notice: Subject to any disclaimer, the term of this patent is extended or adjusted under 35 U.S.C. 154(b) by 659 days.

(21) Appl. No.: 12/547,382

(22) Filed: Aug. 25, 2009

(65) Prior Publication Data

US 2011/0055649 A1 Mar. 3, 2011

(51) Int. Cl.
*G06F 11/22* (2006.01)
*G06F 17/50* (2006.01)

(52) U.S. Cl. ........ 716/136; 716/106; 716/110; 716/111; 716/112; 714/715; 714/724; 714/725; 714/729; 726/25; 703/4; 703/14; 703/15

(58) Field of Classification Search .................. 716/106, 716/110–112, 136; 714/729, 715, 724, 725; 726/25; 703/2, 3, 4, 13, 14, 15
See application file for complete search history.

(56) References Cited

U.S. PATENT DOCUMENTS

| | | | |
|---|---|---|---|
| 2006/0271793 A1* | 11/2006 | Devadas et al. | 713/189 |
| 2008/0072328 A1* | 3/2008 | Walia et al. | 726/25 |
| 2009/0083833 A1* | 3/2009 | Ziola et al. | 726/2 |

OTHER PUBLICATIONS

"Quality Metric of Physical Unclonable Function Derived from an IC's Power Distribution System", by Ryan Helinski, Dhruva Acharyya, and Jim Plusquellic, DAC, Jul. 26-31, 2009.*
Alkabani et al., "Remote Activation of ICs for Piracy Prevention and Digital Right Management," Proceedings of the 2007 IEEE/ACM International Conference on Computer-aided Design, Nov. 2007, pp. 674-677.
Alkabani et al., "Input Vector Control for Post-Silicon Leakage Current Minimization in the Presence of Manufacturing Variability," Design Automation Conference 2008, Jun. 2008, pp. 606-609.
Alkabani et al., "Trusted Integrated Circuits: A Nondestructive Hidden Characteristics Extraction Approach," Information Hiding: 10th International Workshop, May 2008, pp. 102-117.
Beckmann et al., "Hardware-Based Public-Key Cryptography with Public Physically Unclonable Functions," Information Hiding: 11th International Workshop, Jun. 2009, pp. 206-220.
Bolotnyy et al., "Physically Unclonable Function-Based Security and Privacy in RFID Systems," Proceedings of the Fifth Annual IEEE International Conference on Pervasive Computing and Communications, Mar. 2007, 8 pages.
Dabiri et al., "Hardware Aging-Based Software Metering," Proceedings of the Conference on Design, Automation and Test in Europe, Apr. 2009, pp. 460-465.

(Continued)

*Primary Examiner* — Nha Nguyen
(74) *Attorney, Agent, or Firm* — Brundidge & Stanger, P.C.

(57) ABSTRACT

Methods, apparatuses and articles for testing security of a mapping function—such as a Physically Unclonable Function (PUF)—of an integrated circuit (IC) are disclosed. In various embodiments, one or more tests may be performed. In various embodiments, the tests may include a predictability test, a collision test, a sensitivity test, a reverse-engineering test and an emulation test. In various embodiments, a test may determine a metric to indicate a level of security or vulnerability. In various embodiments, a test may include characterizing one or more delay elements and/or path segments of the mapping function. Other embodiments may be described and claimed.

27 Claims, 8 Drawing Sheets

OTHER PUBLICATIONS

Gassend et al., "Silicon Physical Random Functions," Proceedings of the ACM Conference on Computer and Communications Security, Nov. 2002, pp. 148-160.

Gassend et al., "Delay-Based Circuit Authentication and Applications," The Eighteenth Annual ACM Symposium on Applied Computing, Mar. 2003, pp. 294-301.

Lee et al., "A Technique to Build a Secret Key in Integrated Circuits for Identification and Authentication Applications," Symposium on VLSI Circuits, Jun. 2004, pp. 176-179.

Pappu et al., "Physical One-Way Functions," Science, Sep. 20, 2002, pp. 2026-2030, vol. 297.

Majzoobi et al., "Lightweight Secure PUFs," International Conference on Computer Aided Design, Nov. 2008, pp. 670-673.

Majzoobi et al., "Testing Techniques for Hardware Security," IEEE International Test Conference, Oct. 2008, pp. 1-10.

Nelson et al., "SVD-Based Ghost Circuitry Detection," Information Hiding: 11th International Workshop, Jun. 2009, pp. 221-234.

Potkonjak et al., "(Bio)-Behavioral CAD," 45th Design Automation Conference, Jun. 2008, pp. 351-352.

Potkonjak et al., "Hardware Trojan Horse Detection Using Gate-Level Characterization", 46th Design Automation Conference, Jul. 2009, pp. 688-693.

Potkonjak et al., "Trusted Sensors and Remote Sensing," 9th Annual IEEE Conference on Sensors, Nov. 2010, 4 pages.

Potkonjak, M., "Synthesis of Trustable ICs using Untrusted CAD Tools," 47th ACM/IEEE Design Automation Conference, Jun. 2010, pp. 633-634.

Ravi et al., "Security in Embedded Systems: Design Challenges," ACM Transactions on Embedded Computing Systems, Aug. 2004, pp. 461-491, vol. 3, No. 3.

Vahdatpour et al., "Leakage Minimization Using Self Sensing and Thermal Management," International Symposium on Low Power Electronics and Design, Aug. 2010, 6 pages.

Vahdatpour et al., "A Gate Level Sensor Network for Integrated Circuits Temperature Monitoring," 9th Annual IEEE Conference on Sensors, Nov. 2010, 4 pages.

Wei et al., "Scalable Segmentation-Based Malicious Circuitry Detection and Diagnosis", International Conference on Computer Aided Design, Nov. 2010, pp. 4.

Wei et al., "Gate-Level Characterization: Foundations and Hardware Security Applications," 47th ACM/IEEE Design Automation Conference, Jun. 2010, pp. 222-227.

Bernstein, K., et al., "High-Performance CMOS Variability in the 65-Nm Regime and Beyond," IBM Journal of Research and Development, vol. 50, No. 4.5, pp. 433-449,IBM, 2006.

Gassend, B., et al., "Identification and Authentication of Integrated Circuits," Concurrency and Computation: Practice and Experience, vol. 16, No. 11, pp. 1077-1098, John Wiley & Sons, Ltd., 2004.

Guajardo, J., et al., "FPGA Intrinsic Pufs and their Use in IP Protection," in Workshop on Cryptographic Hardware and Embedded Systems (CHES), 2007.

Liu, F., "A General Framework for Spatial Correlation Modeling in VLSI Design," in Design Automation Conference (DAC), pp. 817-822, 2007.

Sedcole, P. and Cheung, P. Y. K., "Within-die Delay Variability in 90nm FPGAs and Beyond," in IEEE International Conference on Field Programmable Technology, pp. 97-104, 2006.

Suh, G. and Devadas, S., "Physical Unclonable Functions for Device Authentication and Secret Key Generation," in Design Automation Conference (DAC), pp. 9-14, Jun. 4-8, 2007.

Tuyls, P., "An Information Theoretic Model for Physical Uncloneable Functions," in International Symposium on Information Theory (ISIT), p. 139, 2004.

\* cited by examiner

FIGURE 3

| Response Bit Sets 301 | Bit Position 305 | | | | | | | |
|---|---|---|---|---|---|---|---|---|
| | 0 | 1 | 2 | 3 | 4 | 5 | 6 | 7 |
| 1 | 0 | 1 | 1 | 1 | 1 | 0 | 1 | 0 |
| 2 | 0 | 1 | 1 | 0 | 0 | 1 | 0 | 1 |
| 3 | 0 | 1 | 1 | 0 | 0 | 1 | 0 | 1 |
| 4 | 1 | 1 | 1 | 1 | 0 | 0 | 0 | 1 |
| 5 | 0 | 0 | 1 | 0 | 1 | 0 | 1 | 1 |
| 6 | 0 | 1 | 0 | 1 | 1 | 1 | 0 | 0 |
| 7 | 1 | 1 | 0 | 0 | 0 | 1 | 1 | 0 |

BIT POSITION 415

|   | 0 | 1 | 2 | 3 | 4 | 5 | 6 | 7 |
|---|---|---|---|---|---|---|---|---|
| 1 | 0 | 1 | 0 | 0 | 1 | 1 | 1 | 0 |
| 2 | 0 | 0 | 1 | 1 | 0 | 1 | 0 | 1 |
| 3 | 1 | 1 | 0 | 1 | 0 | 0 | 0 | 1 |
| 4 | 0 | 1 | 1 | 1 | 1 | 1 | 1 | 0 |
| 5 | 1 | 1 | 1 | 0 | 1 | 0 | 1 | 0 |
| 6 | 0 | 1 | 1 | 1 | 0 | 1 | 0 | 0 |
| 7 | 0 | 0 | 1 | 0 | 1 | 1 | 0 | 1 |

CHALLENGE BIT SETS 411

BIT POSITION 425

|   | 0 | 1 | 2 | 3 | 4 | 5 | 6 | 7 |
|---|---|---|---|---|---|---|---|---|
| 1 | 1 | 1 | 0 | 1 | 0 | 0 | 1 | 0 |
| 2 | 1 | 1 | 0 | 1 | 0 | 1 | 0 | 0 |
| 3 | 1 | 0 | 1 | 0 | 1 | 0 | 1 | 1 |
| 4 | 1 | 0 | 0 | 0 | 1 | 1 | 1 | 1 |
| 5 | 1 | 1 | 1 | 0 | 0 | 0 | 1 | 1 |
| 6 | 1 | 1 | 0 | 1 | 1 | 1 | 0 | 0 |
| 7 | 0 | 0 | 0 | 0 | 0 | 1 | 0 | 0 |

RESPONSE BIT SETS 421

FIGURE 4

An article with computer program product 801

Computer readable storage medium 803

Instructions 805

- receiving sets of response bits corresponding to a response of a Physically Unclonable Function

- analyzing the sets of response bits to determine a level of security vulnerability of a Physically Unclonable Function

- grouping all response values of a particular response bit position of each of a set of response bits

- determining whether grouped response values have a probability of being a particular value that deviates from a baseline probability

- determining a predictability of response values of particular response bit positions based at least on either other response values or various challenge bit position

- determining a relationship between two or more of a plurality of sets of response bits, based on Hamming distances between their corresponding challenge bits

- determining a probability that any two sets of response bits collide

TESTING SECURITY OF MAPPING FUNCTIONS

BACKGROUND

An Integrated Circuit (IC) with compromised hardware security may reveal sensitive information. Conventional hardware security techniques may use cryptographic protocols to provide security. In cryptographic protocols, secrecy may be provided by trapdoor mathematical functions and digital keys, which may make the protocols resilient to algorithmic attacks. However, digital hardware security keys may be attacked in a number of ways including side-channel, electromigration, imaging, and fault injection.

Physically unclonable functions (PUFs) may be used in a number of security tasks. In PUF-based security, the underlying identification may not be in a digital format; instead, the identifiers may be analog variations of the phenomena. This may result in physical systems with behavior that is stable and that is very difficult to physically replicate in another PUF—even another PUF of the same design—due to their complex analog structure. In practical implementations, PUFs may take the form of a separate circuit within an IC.

BRIEF DESCRIPTION OF THE DRAWINGS

The presently disclosed subject matter is particularly pointed out and distinctly claimed in the concluding portion of the Specification. The foregoing and other features of the present disclosure will become more fully apparent from the following Detailed Description and appended Claims, taken in conjunction with the accompanying Drawings. Understanding that these Drawings depict example embodiments in accordance with the disclosure and are, therefore, not to be considered limiting of its scope, the disclosure will be described with additional specificity and detail through use of the accompanying drawings, in which:

FIG. 3 illustrates a grouping of bit positions of a plurality of sets of response bits for determining a test metric indicative of a level of security of a PUF;

FIG. 4 illustrates a grouping of bit positions of a plurality of sets of response bits and a plurality of sets of challenge bits for determining a conditional probability test;

FIG. 8 illustrates a computing program product; all arranged in accordance with the present disclosure.

DETAILED DESCRIPTION OF EMBODIMENTS

Figure 1:
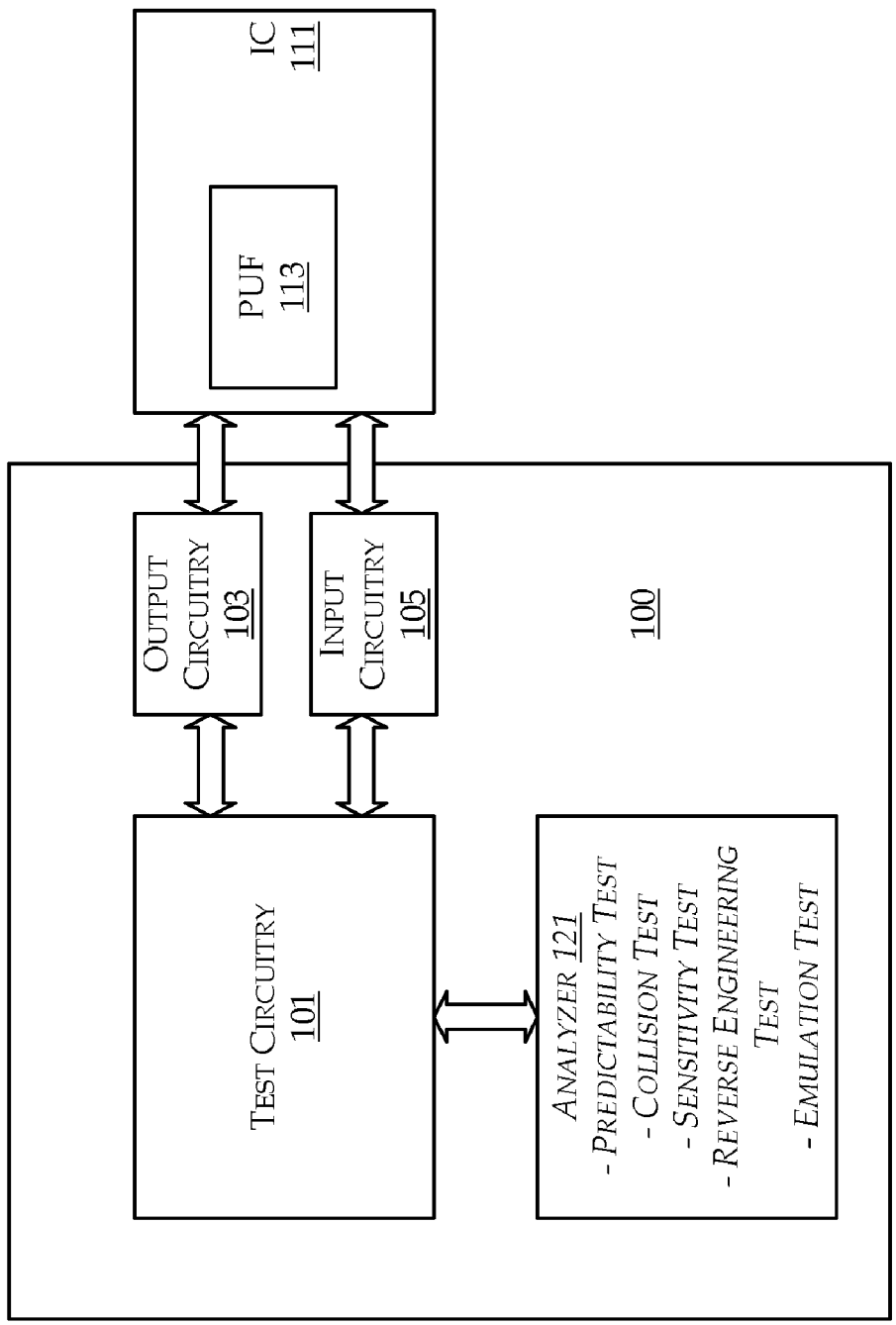
FIG. 1 illustrates a test system for testing mapping function security.

The present description sets forth various examples along with specific details to provide a thorough understanding of claimed subject matter. It will be understood by those skilled in the art, however, the claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the Figures similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, systems and computer program products related to testing security of mapping function security. As used herein, "mapping function" may be any hardware-based security device where each instance of the device provides (or purports to provide) a unique or pseudo-unique mapping from a set of challenges to a set of responses. A Physically Unclonable Function (PUF), or a Public PUF, is a specific type of mapping function that may provide security. Not all mapping functions that provide security are physically unclonable. A cryptographic mapping function may be a type of mapping function that may provide security, and a PUF may also be a cryptographic mapping function. For ease of description, most examples in this Detailed Description will refer to embodiments that use PUFs; however it is to be understood that embodiments will also be applicable to mapping functions of many types that may provide security, including those that are not physically unclonable.

Silicon PUFs typically utilize timing variations of CMOS logic components caused by manufacturing variability. PUFs may accept input (challenge) bits and, in return, may produce response bit outputs that may be reproducible by the PUF—that is, the same input will cause the same output every time it is input—but that are very difficult for another device or system to predict or replicate because the output may be seemingly random. In an example PUF structure according to a conventional design, challenge bits may each be input into corresponding switches within a chain of switches. A challenge bit input may alter the path taken by a signal through a single switch within the chain of switches. Because of manufacturing variability, each path through the switch may have delay differences even though the paths have the same design. Altering the challenge bits therefore may change the overall delay encountered by the signal as it passes through the chain of switches. Generally, no two PUFs—even those with the same design—will have the same delay characteristics. Arbiters placed at the end of the chain of switches may compare the analog timing difference between a logic path signal and a clock signal, or the analog timing difference between two logic paths, and may produce a digital output dependent upon the timing differences. An arbiter may be a digital component that takes two inputs: the arbiter output may be a binary "1" if its first input arrives earlier than the second input, i.e., the path ending at the first arbiter input has a shorter delay. The arbiter output may be "0" otherwise. Other digital components that translate the analog timing difference to a digital value may also be used instead.

Broadly speaking, there are several types of attacks that may be leveled against PUFs. These attacks may include prediction attacks, reverse-engineering attacks, collision attacks, and emulation attacks. The security testing methods described herein may be used to determine the robustness of a PUF—or other mapping function that may provide security—against one or more of such attacks.

A prediction attack may involve an adversary who has access to the PUF, or to a partial database of challenge-response-pairs (CRPs), and who may attempt to predict the PUF's response to a new challenge in several ways. These attacks may include using single-bit probabilities, conditional probabilities, and Hamming distances between challenge bits to predict response bit outputs of a PUF.

A reverse-engineering attack may involve an attempt to model the input/output behavior of the system by studying a set of CRPs. The reverse-engineering attack may be more effective when the attacker has full or partial knowledge of the PUF architecture, since PUF architecture effects PUF behavior.

A collision attack may involve determining whether or not two sets of challenge bits may result in the same set of response bits. A collision may occur in a multiple-output PUF if two different challenge sets produce the same response on the PUF. Also, two different PUFs may collide on their complete or partial CRP space. For a single PUF, the collision attack may be relevant when the PUF is used as a hash function. Since a hash value may be used as a fixed length signature of the challenge bits, it may be desirable to have a unique signature for each set of challenge bits input with a very high probability. The more likely it is that two outputs will collide, the more likely it is that an adversary could predict the hash value.

An emulation (replay) attack may involve an attempt to store CRPs in digital memory. If the storage is efficiently done, the digitally stored information can emulate (replay) the PUF. Since there may be many possible CRPs, this form of attack may only be feasible if the adversary can find a way to efficiently compress and store the CRPs. To ensure resiliency against this attack, it may be desirable for the CRPs to have a low level of compressibility.

Embodiments may include methods, apparatuses, and systems to perform one or more security tests. The one or more security tests may include a predictability test, a collision test, a sensitivity test, a reverse engineering test, and an emulation test. These tests may be performed on an integrated circuit, such as an on a PUF incorporated as part of an integrated circuit, or these tests may be performed on an emulated or simulated PUF design. When tests are performed on emulated or simulated PUF designs, a security metric may be determined for those emulated PUFs to allow a decision to be made as to whether to fabricate actual integrated circuits according to the emulated PUF designs. PUF emulation or simulation may be carried out in hardware or software. As an example of a hardware emulation, a field programmable gate array (FPGA) or other programmable hardware circuit may be programmed to emulate a PUF. Tests according to embodiments may be performed on such an emulated PUF. Although the embodiments described herein may refer in many instances to PUFs incorporated on integrated circuits, it is to be understood that embodiments are not so limited, and the same or similar tests may be performed on emulated or simulated PUFs. A limited number of integrated circuits may be fabricated according a PUF design and then tested to determine a level of security of the PUF design.

FIG. 1 illustrates a test system 100 for testing security of mapping function circuitry, in accordance with various embodiments. As discussed earlier in this Detailed Description, a PUF is a type of mapping function that may provide security. For ease of explanation, embodiments described in this Detailed Description may be described in reference to PUFs, but it is to be understood that embodiments are not limited to PUFs but may be practiced in, on, or in conjunction with, other mapping functions that may provide security. As shown in FIG. 1, test system 100 may include test circuitry 101, output circuitry 103, input circuitry 105, and analyzer 121 coupled to each other as illustrated. Output circuitry 103 may be configured to interface with an input of PUF 113 of an integrated circuit (IC) 111, and input circuitry 105 may be configured to interface with an output of PUF 113. As described above, PUF 113 may in alternate embodiments be emulated using a FPGA or other hardware circuit. Test circuitry 101 may be configured to input a plurality of sets of challenge bits to PUF 113 via output circuitry 103. Test circuitry 101 may also be configured to receive a plurality of sets of response bits from PUF 113 via input circuitry 105. Each set of response bits may correspond to a response of the PUF to individual ones of the sets of challenge bits input via output circuitry 103. There may be more response bits than challenge bits, fewer response bits than challenge bits, or equal numbers of response bits and challenge bits. Although only IC 111 and PUF 113 are shown in FIG. 1, it will be appreciated that test circuitry 101, output circuitry 103 and input circuitry 105 may be used, in some embodiments, to interface with many ICs and PUFs in order to test them.

Analyzer 121 may be operably coupled to test circuitry 101. Analyzer 121 may be configured to analyze at least the plurality of sets of response bits to perform one or more PUF security tests. In various embodiments, the one or more PUF security test may include a predictability test, a collision test, a sensitivity test, a reverse engineering test, and/or an emulation test, to be described more fully below. Analyzer 121 may be configured to analyze at least the plurality of sets of response bits to determine a test metric indicative of a level of security vulnerability of the PUF to perform one or more tests. Analyzer 121 may be configured to analyze other data besides the sets of response bits such as, for example, the plurality of sets of challenge bits and/or a known partial or full model of the PUF architecture under test. Analyzer 121 may be configured to perform one or more tests on some or all of such data—including the plurality of sets of response bits— such as are described herein. In some embodiments, analyzer 121 may be implemented within a general or special-purpose computing system. In other embodiments, the logic of analyzer 121 may be implemented as logic within a field programmable gate array (FPGA) or within an Application-Specific Integrated Circuit (ASIC).

In some embodiments, IC 111 may comprise multiple PUFs 113. A level of security vulnerability can be determined for each PUF 113. In embodiments, analyzer 121 may be configured to determine which of PUFs 113 should be used when IC 111 is deployed based at least on the relative levels of security vulnerability of each of PUFs 113.

In some embodiments, analyzer 121 may be configured to accept test results from multiple ICs and determine how well a particular PUF design and/or a particular manufacturing process provides security. This may include, for example, determining a percentage of ICs in a group of ICs that meet predetermined minimum security benchmarks or criteria. These benchmarks or criteria may include a level of predictability, for example.

Embodiments may also include analyzers configured to simulate a PUF using a specific user-selected model of variability to ensure that all or a high percentage of PUFs will be able to pass tests as described elsewhere within this detailed description.

Figure 2:
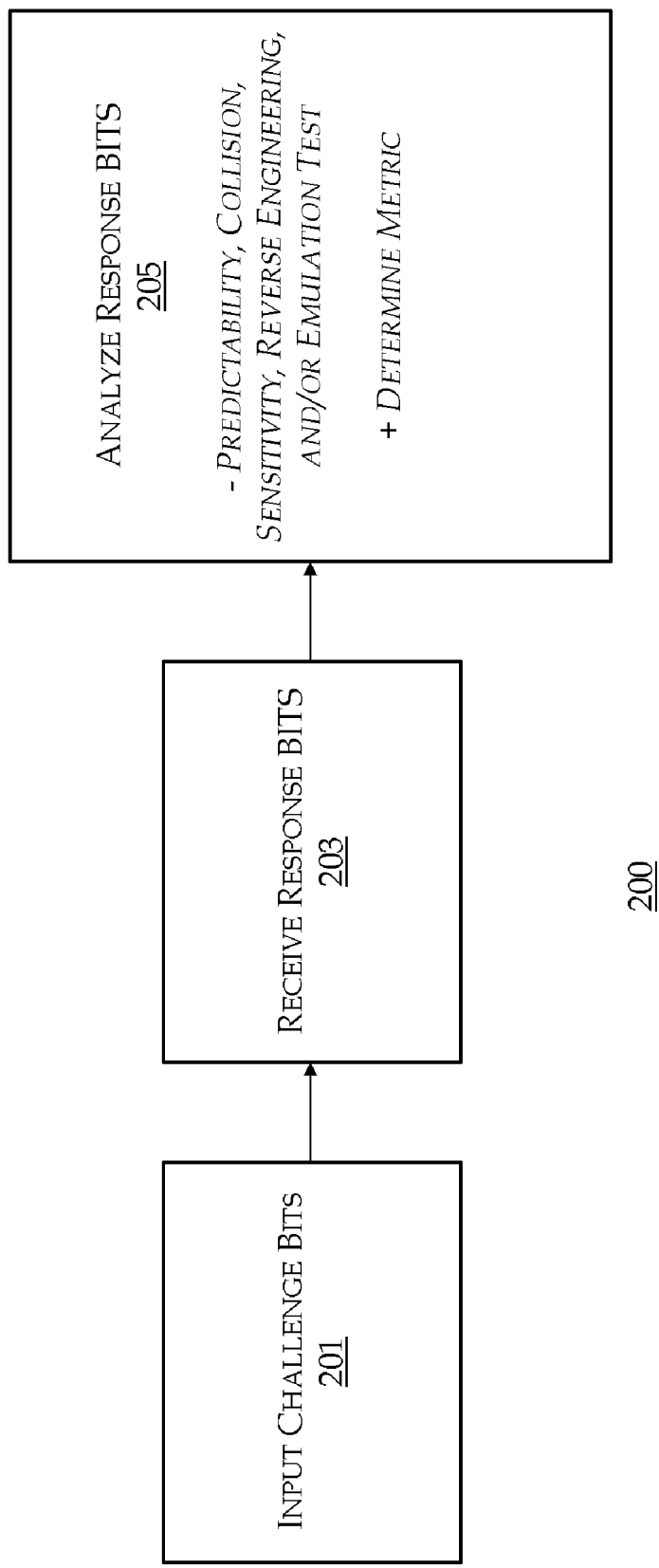
FIG. 2 illustrates method for testing PUF security.

FIG. 2 illustrates a method 200 for testing PUF security, in accordance with various embodiments. Method 200 may start with block 201, inputting challenge bits. At block 201, a testing system may input, e.g. sequentially, a plurality of sets of challenge bits into a PUF. Each set of challenge bits may be designed to result in a set of corresponding response bits from the PUF. From block 201, method 200 may proceed to block 203, receive response bits. At block 203, the testing system may then receive a plurality of sets of response bits from the PUF. In some embodiments where PUFs may be single-output PUFs, the set of response bits may include only one response bit. In PUFs having multiple outputs, the sets of response bits may include two or more response bits. From block 203, method 200 may proceed to block 205, analyze response bits. At block 205, an analyzer may then analyze at least the plurality of sets of response bits to perform one or more PUF security tests. The tests may include a predictability test, a collision test, a sensitivity test, a reverse engineering test, and/or an emulation test. The analyzer may then analyze at least the plurality of sets of response bits to determine a test metric indicative of a level of security vulnerability of the PUF. Various metrics are described elsewhere within this description. While some of the tests (e.g., predictability and emulation tests) may analyze only the response bits and/or the challenge bits without considering the inside structure of the PUF, other tests may exploit the internal structure of the PUF.

In various embodiments, a number of tests may include determining a test metric (or simply metric) indicative of a level of security or vulnerability. In various embodiments, determining a metric may include computing a deviation of a property of the tested PUF from a nominal value. In various embodiments, each test may comprise several CRPs, and the comparative error to the nominal value for the $(c_i, r_i)$ CRP may be denoted by $err_i$. A metric may be in the $l_p$ norm of the error, and may be defined as:

$$\|err\|l_p = \left(\sum_{i=1}^{I} |err_i|^p\right)^{1/p}, \text{ if } 1 \le p < \infty;$$

$$\|err\|l_p = \max_{i=1}^{I} |err_i|, \text{ if } p = \infty.$$

Where p is the degree for the error metric (e.g. the norm of the error). This is a standard mathematical notation, universally used. For example, if p=1, the equation would be the sum of absolute values of error terms. For p=2, this would be the square root of the sum of square error. For p=3, this would be the third root of the sum of error terms to power three, and so on. Turning now first to the predictability test, in various embodiments, a predictability test may include one or more probability tests. In various embodiments, the probability tests may include single-bit probability tests, conditional probability tests, and/or Hamming distance tests. These three tests will be discussed in turn with references to FIGS. 3 and 4, but it will be appreciated that some embodiments may employ more or fewer probability tests.

Single-bit probability tests may target each individual response bit. If a PUF output bit position were completely random, the probability that the output bit position is a 0 (or 1) would be exactly 0.5. In real-world PUFs, this probability will deviate somewhat from 0.5. The more this probability deviates from 0.5, the more likely it is that an attacker may be able to predict a value of an output bit position with a probability greater than that given by random chance. Thus, the evaluation metric for this test may be an amount of deviation from the random case.

FIG. 3 illustrates a grouping of bit positions of a plurality of sets of response bits for determining a test metric indicative of a level of security of a PUF, in accordance with various embodiments. In the single-bit probability test, an analyzer may analyze a plurality of sets of response bits by grouping all response values of a particular bit position of each of the plurality of sets of response bits, as shown in FIG. 3. In FIG. 3, seven sets of response bits 301 are shown, each with eight bit positions 305 labeled 0-7. In various embodiments, the fifth bit position may be "grouped" (indicated in FIG. 3 by the encirclement of all bit values of the fifth bit position). An analyzer according to some embodiments may be configured to determine an amount of deviation of the probability that this bit position—or any other bit position—is a 0 (or a 1), from a baseline probability of 0.5. It will be appreciated that in practical implementations, many more than seven response bit sets may be utilized in order to produce results that may be statistically significant.

Conditional probability tests may attempt to determine the conditional probability of one or more response bits with respect to other response bits and/or with respect to the challenge bits. Since there are many output bits and it may be infeasible to test the joint probability of all the outputs and inputs, the test may be restricted to fewer bits. The range of many possible tests in this category includes the probability of each response bit given the occurrence of each challenge bit, the probability of each response bit conditioned on other response bit(s), and/or the probability of each response bit conditioned on a subset of challenge bits and/or response bits. The internal structure of the PUF may be utilized for determining the independent bits. A test metric may be defined as the deviation from the case where bits are completely random.

A class of conditional probabilities that may be particularly relevant to PUF security vulnerability is the conditional transition probability. The transitional probability targets the probability of a transition of a response bit, if a set of challenge (or response) bits transition from 0 to 1, and vice-versa.

FIG. 4 illustrates a grouping of bit positions of a plurality of sets of response bits and a plurality of sets of challenge bits for determining a conditional probability test, in accordance with various embodiments. In FIG. 4, seven sets of challenge bits 411 are shown, each with eight bit positions 415 labeled 0-7. Also, seven sets of response bits 421 are shown, each with eight bit positions labeled 0-7. It is shown in FIG. 4 that the second bit position of the challenge bits has been "grouped" (indicated by the encirclement of all bit values of the second bit position). Also, the fourth and fifth bit positions 425 of response bits 421 as well as the first bit position 425 of response bits 421 have been likewise grouped. An analyzer according to some embodiments may be configured to determine a deviation from a baseline probability that a transition in, for example, the second bit position 415 of challenge bits 411 will be accompanied by a transition in, for example, the first bit position 425 of response bits 421. In the same or alternative embodiments, the analyzer according to some embodiments may be configured to determine a deviation from a baseline probability that a transition in, for example, the fourth and fifth bit positions 425 of response bits 421, will be accompanied by a transition in, for example, the first bit position 425 of response bits 421.

It will be appreciated that in practical implementations, many more than seven responses and challenge bit sets may be utilized in order to produce results that may be statistically significant. The baseline probability may be 0.5 in some embodiments where each bit position may be one of two values (e.g. a "0" or a "1"). Although specific examples are illustrated in FIG. 4, it will be appreciated that other groupings may be analyzed for deviation from the random case. Also, multiple permutations of response bit groupings and/or challenge bit groupings may be analyzed in order to determine security vulnerabilities. A test metric according to various embodiments may be a deviation from a transition probability of 0.5 for one or more groupings of response bits.

A key predictability factor may come from studying pairs of challenge vectors. For a PUF to be sufficiently secure, the PUF responses to challenge vectors that differ in one (or only a few) bit(s) should be, in general, no less different than responses to challenge vectors with many bit differences. If the PUF responses to similar challenge vectors have a high likelihood of being similar, then an adversary with at least some knowledge of the universe of CRPs may be able to predict other response bits with a higher than random probability. An analyzer according to some embodiments may be configured to determine whether there may be a predictable relationship between two or more response bit sets, based at least on Hamming Distances between their corresponding sets of challenge bits. For example, the density of the Hamming Distances of a sampling of response vectors may be compared to the density of their corresponding challenge vectors. The deviation of this density compared to the ideal case may be utilized as a metric of predictability. The more uncorrelated the density of the Hamming Distances of the response vectors are to the density of the Hamming Distances of the challenge vectors, the more secure may be the PUF.

Turning now to the collision test, in various embodiments, an analyzer may be configured to determine whether any sets of response bits collide. In other words, this test may aim to find a pair of challenges that generate the same response. In an ideal setting, the probability of collision might be zero. However, since the space of challenges is typically larger than the space of responses, reaching zero may be practically impossible.

For each given challenge, the PUF responses on various chips may form a uniform distribution to yield the minimum or reduced collision probability. For non-linear PUFs, with nonlinearity introduced by e.g., feed-forward arbiters, the PUF responses may be distorted, and the PUF may exhibit higher collision probability, even in the presence of completely independent delays and perfect arbiters. Depending on the PUF circuit structure and the location of nonlinearity, there may be a lower bound on collision probability. For a parallel PUF that consists of N response bits (N parallel rows of delay circuits), the minimum or reduced collision probability may be $1/(2^n)$. For example, if the parallel PUF has 8 output bits, then the collision probability may be $\frac{1}{256}$.

Turning now to the sensitivity test, an analyzer, in various embodiments, may be configured to test a PUF to determine the required manufacturing variability such that a PUF operates in secure way when the components are imperfect. A sensitivity test may determine the required manufacturing variability such that a PUF operates in secure way when the components are imperfect. Sensitivity tests may be technology-dependent. For example, for a fixed-silicon technology, the nominal values of the arbiter's set-up and hold-up times may be available from design specification or measurements. The PUF architecture may also impact sensitivity of the response bits on the internal components. In various embodiments, the sensitivity test may be performed in a learn-and-test approach. Benchmark studies may be used to learn the sensitivity of PUF behavior to the underlying structure and environmental conditions. The sensitivity may be tested and compared with the benchmark to help diagnose the sensitive parts of the structure.

Arbiters, employed in PUFs to output digital values representative of the analog differences, may be formed with certain flip-flops. These arbiters may be non-ideal for two reasons: (i) insensitivity to small delay differences, characterized by setup/hold times, and (ii) asymmetry in setup/hold times. The former may lead to arbiters producing non-deterministic meta-stable responses if the delay differences of the signals at the arbiter input are smaller than the arbiter setup/hold times. Meta-stable responses may vary with environmental fluctuations. Asymmetry in the setup/hold times may cause either the "0" or "1" response to be more likely, biasing the PUF output. Some embodiments of a circuitry suitable for characterizing flip-flops to constitute arbiters and/or characterize path segments will be described later with reference to FIG. 6 after reverse engineering and emulation tests have been described.

In various embodiments, the effect of delays' spatial correction may be tested. Some embodiments may employ multivariate Gaussian distribution, for example using the exponential correlogram function ($e^{-\alpha}$) to model spatial correlations, where $\alpha$ is a correlogram function parameter. Larger $e^{-\alpha}$ value may indicate a stronger level of spatial correlation. In addition to non-ideal arbiters and delay correlations, PUF switches may also suffer from faults and large delays in one or more of the switches of the delay circuits of the PUF.

Figure 5:
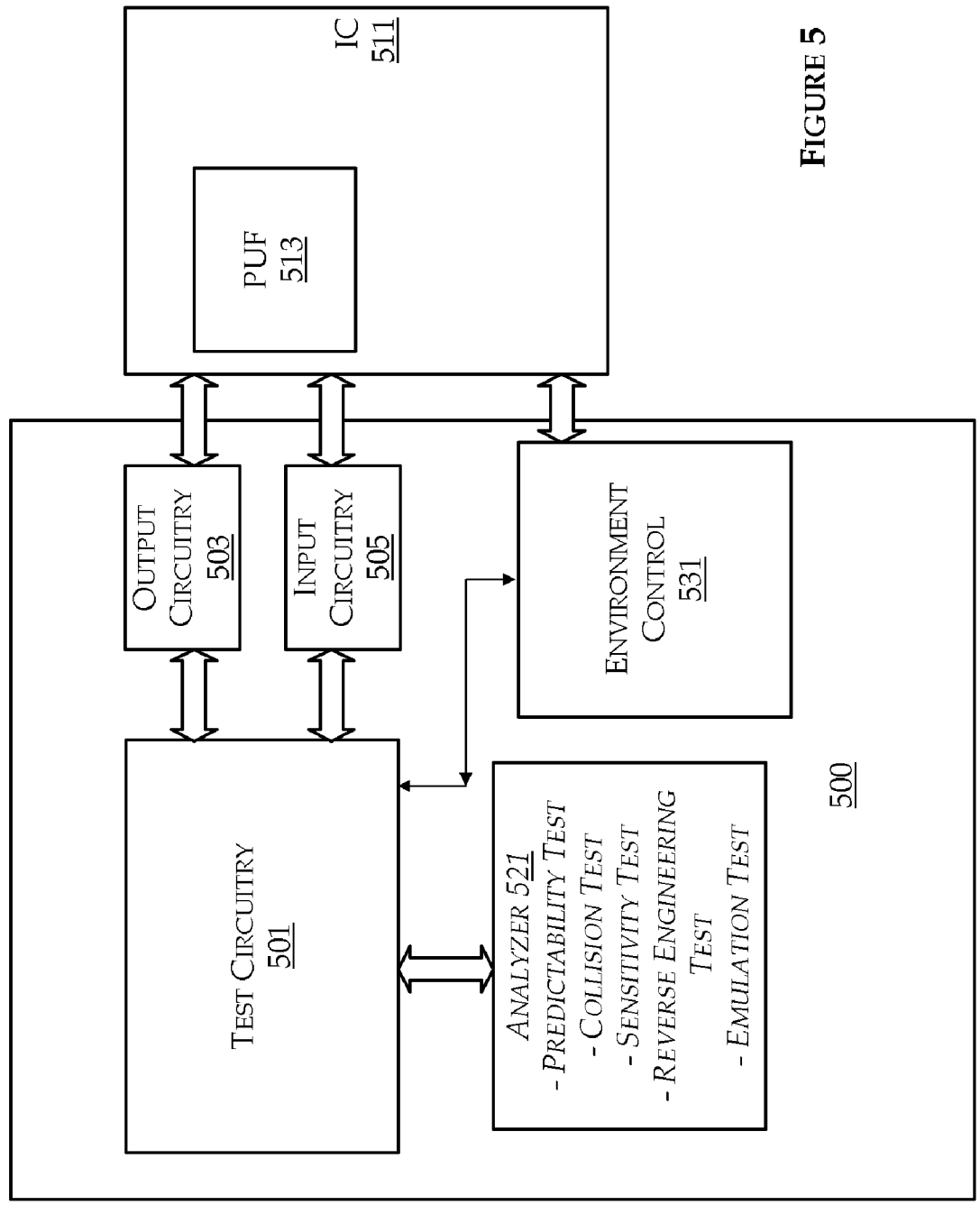
FIG. 5 illustrates a test system including an environmental control element for testing PUF.

FIG. 5 illustrates a test system 500 including an environmental control element for testing PUF security, in accordance with various embodiments. Similar to test system 100 of FIG. 1, test system 500 may include test circuitry 501, output circuitry 503, input circuitry 505 and analyzer 521, coupled to each other as illustrated. Test system 500 differs from test system 100 in that it may further include environmental control 531 coupled to test circuitry 501 as shown. Test circuitry 501, output circuitry 503, input circuitry 505, and analyzer 521 may be the same, or similar to, similar components depicted in FIG. 1. During a first time frame, test circuitry 501 may be configured to input a plurality of sets of challenge bits into PUF 513 via output circuitry 503. Test circuitry 501 may be configured to receive, from PUF 513 via input circuitry 505, a plurality of sets of response bits. During this first time frame, environmental control element may be configured to impose a first environmental condition on integrated circuit (IC) 511. An example of an environmental condition may be a temperature.

During a second time frame, test circuitry 501, or some other component such as analyzer 521, may be configured to control environmental control 531 to impose a second environmental condition, such as for example a second temperature that is lower or higher than a first temperature imposed during the first time frame. During the second time frame— where IC 511 is subject to the second environmental condition—test circuitry 501 may be configured to then output the same challenge bits into PUF 513 as were input previously during the first time frame and to receive from PUF 513 another plurality of sets of response bits. Analyzer 521 may be configured to receive these response bits and to determine whether there is a difference between the plurality of sets of response bits received during the first time frame and the other plurality of sets of response bits received during the second time frame. In this way, the test system may be configured to determine whether a PUF may be stable over various environmental conditions or sensitive to one or more environment factors, which may affect the security of the PUF. In various embodiments, test circuitry 501 may be configured to impose three or more environmental conditions on IC 511 and receive three or more pluralities of sets of response bits. In such embodiments, analyzer 521 may be configured to analyze all three pluralities of sets of response bits to determine differences. In some embodiments, such analysis may be used to determine whether the PUF may be stable over various environmental conditions or sensitive to one or more environment factors.

In similar embodiments, an operational condition—such as for example an operating voltage—may be used to operate IC 511 in a first time frame and a different operational condition may be used to operate IC 511 in a second time frame. Test circuitry 501 and/or analyzer 521 may be configured to determine whether the behavior of a PUF is stable over various operational conditions, or sensitive to one or more operational factors, which may affect the security of the PUF. Other operational conditions may include functions that IC 511 is configured to perform. Such functions may or may not be related to PUF operation.

Referring to FIG. 1 again, test system 100 may be configured to perform reverse-engineering tests. In particular, test system 100 may be configured to determine delay characteristics of one or more of the delay components within a PUF structure, based at least on a known structure of the PUF, and a plurality of CRPs. As alluded to earlier, some embodiments of a circuitry suitable for characterizing flip-flops to constitute arbiters and/or characterize path segments will be described later with reference to FIG. 6 after reverse engineering and emulation tests have been described.

A PUF, e.g. a parallel PUF having multiple delay lines, may be reverse-engineered using a linear number of CRPs forming a system of linear inequalities that may be solved for finding the path segment delays ($\delta$'s). For each challenge input vector ($c'_1[I], \ldots, c'_N[I]$) used in I-th measurement and the corresponding response bit $r[I]$, an inequality equation may be formed:

$$\sum_{i=1}^{N} (-1)^{\rho_i^N} \delta_i + \delta_{N+1} \overset{r=0}{\underset{r=1}{\lessgtr}} 0. \quad (1)$$

where $\rho_j(.)$ is defined by:

$$\rho_i^j = \bigoplus_{x=i,i+1,\ldots,j} c_x = c_i \oplus c_{i+1} \oplus \ldots \oplus c_j \quad (2)$$

The direction of inequality may be determined by the PUF response to the I-th challenge vector. In the presence of measurement errors, an error term $\epsilon[I]$ may be added to the left side of each term in inequality equation. A linear program (LP) may be formulated where the set of inequalities in the inequality equation may be the constraints and the objective function may be to minimize a norm of error over L measurements; e.g., minimize $\Sigma_{i=1}^{L} \cdot |\epsilon[I]|$.

This reverse-engineering approach may be evaluated using a set of CRPs. In various testing, using only about 3000 CRPs, a conventional parallel PUF may be modeled with 99% accuracy.

PUFs with injected non-linearity, e.g. PUF with feed-forward arbiters (FFAs), on the other hand may be reverse-engineered as follows. The total path delay difference incurred by a signal until the K+K' switch, may be denoted as $\Delta$, then:

$$\Delta = \sum_{i=1}^{K} (-1)^{\rho_i^{K+K'}} \delta_i + \quad (3)$$

$$(-1)^{\rho_{K+1}^{K+K'}} (y_{K+1} + \delta_{K+1}^*) + \sum_{i=K+2}^{K+K'} (-1)^{\rho_i^{K+K'}} \delta_i + \delta_{K+K'+1}.$$

The delay in the segment between the switch K and switch K+1 may be broken down into two parts, $\delta_{M+1}$ and $\delta^*_{M+1}$ and therefore the PUF may have one more parameter than a linear PUF.

For the sake of simplicity, the measurement index I (previously defined for Equation 1) may be removed. The feed-forward arbiter's result, $c_{K+K'}$, may provide another inequality:

$$\sum_{i=1}^{K} (-1)^{\rho_i^K} \delta_i + \delta_{K+1} \overset{c_{K+K'}=0}{\underset{c_{K+K'}=1}{\lessgtr}} 0. \quad (4)$$

The following identity, which can be directly derived from the definition of $\rho_i^j$ may be used:

$$\rho_i^{K+K'} = \rho_i^{K+K'-1} \oplus c_{K+K'} \quad (5)$$

$$= \rho_i^K \oplus \rho_{K+1}^{K+K'}$$

$$= \rho_i^K \oplus \rho_{K+1}^{K+K'-1} \oplus c_{K+K'}.$$

Observing that $(-1)^{a \oplus b} = (-1)^a (-1)^b$, the equation directly above may be further simplified to:

$$\Delta = (-1)^{\rho_{K+1}^{K+K'-1}} |\Delta_{first}| + \quad (6)$$

$$(-1)^{c_{K+K'}} \left( (-1)^{\rho_{K+1}^{K+K'-1}} \delta_{K+1}^* + \Delta_{middle} \right) + y_{K+K'+1}$$

Where $\rho_{K+1}^{K+K'-1}$ is the parity (XOR results) of the challenges to a middle stage. $\Delta_{first}$, $\Delta_{middle}$, and $\Delta_{last}$ are the first, middle, and last stage differential delays respectively, computed as:

$$\Delta_{first} = \sum_{i=1}^{K} (-1)^{c_i^K} \delta_i + \delta_{K+1}, \tag{7}$$

$$\Delta_{middle} = \sum_{i=K+2}^{K+K'-1} (-1)^{c_i^{K+K'-1}} \delta_i + \delta_{K+K'}, \tag{8}$$

$$\Delta_{last} = \sum_{i=K+K'+1}^{N} (-1)^{c_i^N} y_i + y_{N+1}. \tag{9}$$

The total delay now may be expressed as:

$$\Delta_{total} = \Delta \times (-1)^{c_{K+K'+1}^N} + \delta_{last}. \tag{10}$$

The reverse-engineering of PUFs with feed-forward arbiters may be completed by using the following observations. By fixing the selector bits of the switches in a first stage (K first switches), the delays of elements in the middle and last stage may be estimated by solving an LP problem similar to the one used to reverse-engineer parallel PUFs. However, two assumptions on the feed-forward arbiter output need to be made, and the LP would therefore have two solutions. The solutions obtained by using these two assumptions may only differ in sign that may be later easily resolved.

Knowing the delays of switches of the middle and last stages (with a sign ambiguity for the delays of the middle stage) and considering the PUF formulation (Equation 10), the challenges to the middle and last segments may be set in a way that any transition of the final arbiter may be closely linked to the transitions of the feed-forward arbiter output. This may be realized by choosing a challenge configuration that yields a large delay difference for the middle stage ($\Delta_{middle} \gg 0$), while causing a negligible delay difference at the last stage ($\Delta_{last} \approx 0$).

While the challenge bits to the middle and last stages may be fixed to the appropriate configuration as described above, complementary challenges may be applied to the first stage switches, and transitions of PUF responses (final arbiter response transitions) may then be recorded. Any time the final arbiter response flips, a constraint for the LP may be obtained. Since the concern may be with transitions, rather than absolute output values, two LP problems may be addressed by trying two different bit assignments. However, the delay values obtained from the incorrect solutions may be easily rejected by cross-validating the results on a few new CRPs.

Using the estimated delays of the first stage, the ambiguity in the sign of the middle-stage delays difference may be eliminated or reduced. Therefore the delays of all switches may be estimated successfully.

Note that finding the challenge configuration to the middle and last stages that yields the largest and smallest possible delay differences may, in general, a Nondeterministic Polynomial time complete problem (NP-complete problem). But an exact solution may not needed; a rough approximation that gives a very small (large) delay may be sufficient. For example, a small number of challenge bit combinations (for example 1000 combinations) may be sufficient to find one that gives the minimum delay difference.

Turning now to the emulation test, test systems according to various embodiments, may be conducted to perform an emulation test, such as for example by algorithmically searching for redundancies in CRPs. While an optimal search to find all possible redundancies may be an NP-complete problem, one may still estimate a lower bound. Compressibility may be separately found for each input vector, and then combined with all vectors that are smaller than a specific Hamming Distance away and that result in the same output.

Figure 6:
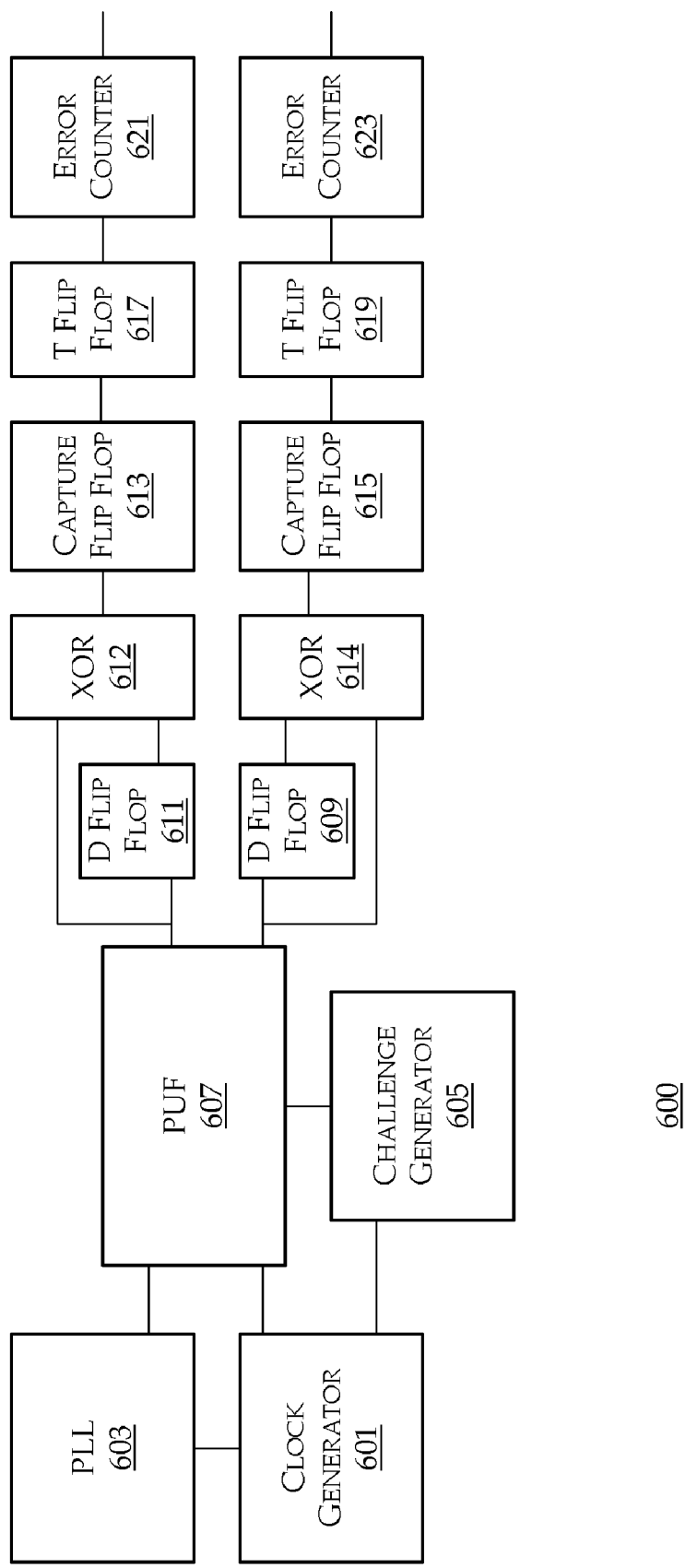
FIG. 6 illustrates a block diagram of a characterization circuit for characterizing components or path segments of a PUF.

FIG. 6 illustrates a block diagram of a characterization circuit 600 for characterizing components or segment paths of a PUF in accordance with various embodiments. Characterization circuit 600 may be employed to in one or more earlier-described security tests, e.g., sensitivity test, reverse-engineering test, or emulation test. In various embodiments, characterization circuit 600 may include a clock generator 601 that may be coupled to phase-locked loop (PLL) circuit 603. Challenge Generator 605 may be coupled to PUF 607 which may included a plurality of delay switches, organized into a plurality (e.g., two) parallel path segments. In various embodiments, the characterization circuitry 600 may be used to interface with and characterize multiple PUFs. Two D flip-flops 609 and 611 may be coupled to each of two outputs of PUF 607. Inputs of two exclusive-or (XOR) logic elements 612 and 614 may each be coupled to one of PUF 607 outputs as well as to outputs of the D flip-flops 609 and 611. Outputs of the two D flip-flops 609 and 611 may be coupled to inputs of capture flip-flops 613 and 615. Outputs of capture flip-flops 613 and 615 may be coupled to inputs of T flip-flops 617 and 619, respectively. Outputs of T flip-flops 617 and 619 may be coupled to inputs of error counters 621 and 623, respectively.

The characterization circuit 600 may be operated by setting a frequency of clock generator 601 and then increasing (or decreasing) the frequency of the clock generator 601 until an output of one of the D flip-flops 609 and 611 switches from sequential "0"s (or "1"s) to "1"s (or "0"s). The delay of the relevant delay path may then be determined by the clock generator frequency that causes this switch. Also, the reliability of the D flip-flops 609 and 611 may be determined by counting the number of errors, which may be defined by the number of interleaved "0"s and "1"s.

In various embodiments, some of the elements of characterization circuit 500 may be integrated as part of the host integrated circuit of the PUF. In various embodiments, one of the D flip-flops 609 or 611 may be used as a PUF arbiter as described elsewhere within this description. Data on which path of a PUF having a higher (or lower) delay for various input vectors (e.g. challenge bits applied to a delay switch of a PUF) may be determined. A linear program may be used to determine delay differences between the path segments between each consecutive pairs of switches.

Figure 7:
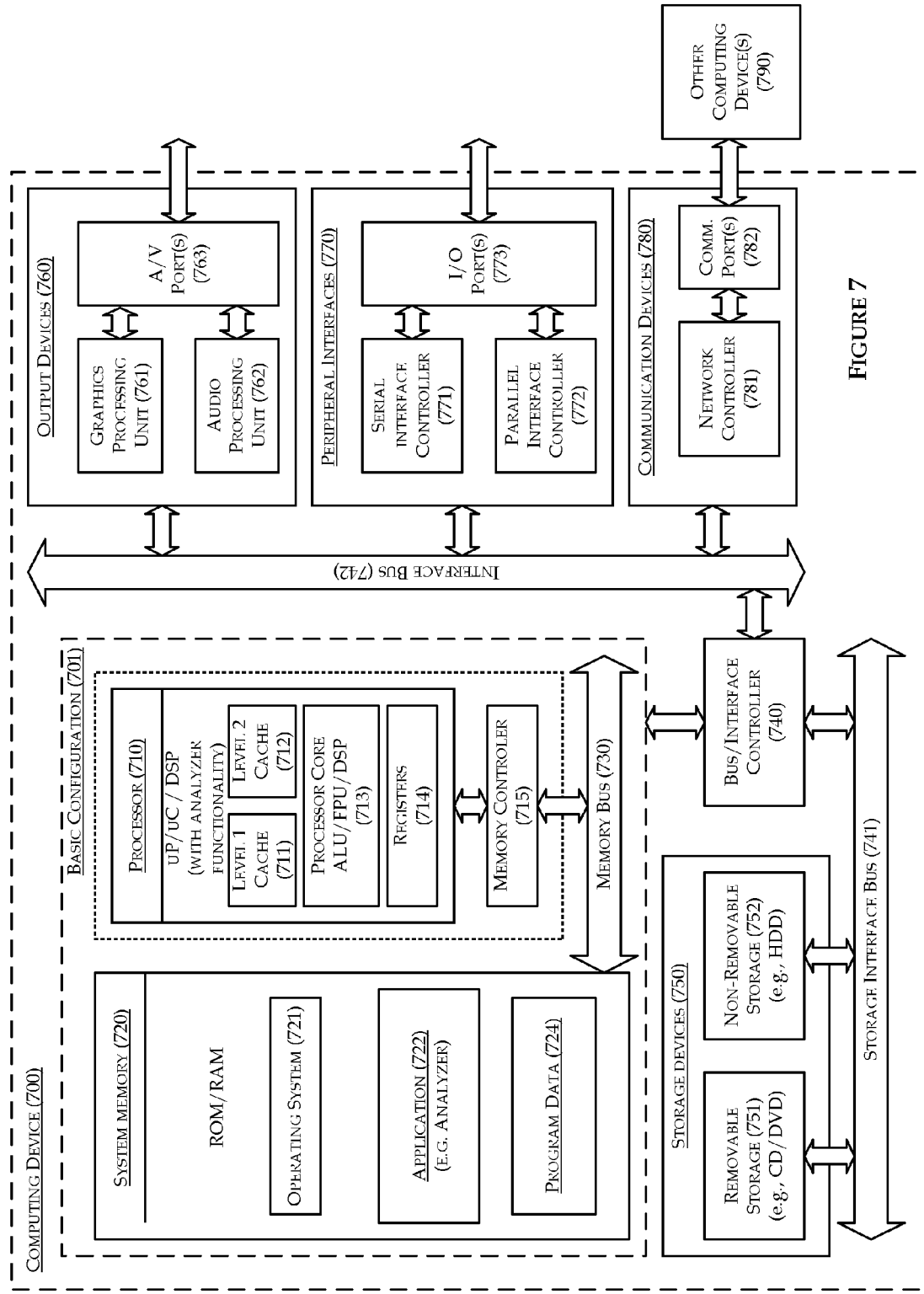
FIG. 7 is a block diagram illustrating an example computing device.

FIG. 7 is a block diagram illustrating an example computing device configured in accordance with the present disclosure. In a very basic configuration 701, computing device 700 typically includes one or more processors 710 and system memory 720. A memory bus 730 may be used for communicating between the processor 710 and the system memory 720.

Depending on the desired configuration, processor 710 may be of any type including but not limited to a microprocessor (µP), a microcontroller (µC), a digital signal processor (DSP), or any combination thereof. Processor 710 may include one more levels of caching, such as a level one cache 711 and a level two cache 712, a processor core 713, and registers 714. An example processor core 713 may include an arithmetic logic unit (ALU), a floating point unit (FPU), a digital signal processing core (DSP Core), or any combination thereof. An example memory controller 715 may also be used with the processor 710, or in some implementations the memory controller 715 may be an internal part of the processor 710. In some embodiments, processor 710 may be configured to perform one or more analysis functions on pluralities of sets of response bits, pluralities of CRPs, and/or other data collected from or about a PUF. In various embodiments, processor 710 may be embodied with one or more functions of an analyzer of a test system as described elsewhere within this description.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724 associated with operating system 721 and applications 722. One or more applications 722 may be configured to program all or some of an analyzer or other function as described elsewhere within this description.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer-readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output devices 760 include a graphics processing unit 761 and an audio processing unit 762, which may be configured to communicate to various external devices such as a display or speakers via one or more NV ports 763. Example peripheral interfaces 770 include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication device 780 includes a network controller 781, which may be arranged to facilitate communications with one or more other computing devices 790 over a network communication link via one or more communication ports 782.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer-readable media as used herein may include both storage media and communication media.

FIG. 8 illustrates a computing program product in accordance with various embodiments, all arranged in accordance with the present disclosure. Computing program product 801 may comprise signal-bearing medium 803. Computing program product 701 may be, for example, a compact disk (CD), a digital versatile disk (DVD), a solid-state drive, a hard disk drive, other optical storage, magnetic cassettes, magnetic tape, magnetic disk storage or other magnetic storage devices, or any other article having a signal-bearing medium. Some embodiments are not limited to any type or types of computing program products. Signal-bearing medium 803 may contain one or more instructions 805. Various embodiments may have some or all of the instructions depicted in FIG. 8. Some embodiments of computing program product 801 may have other instructions.

The herein-described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various operations may be described as multiple discrete operations in turn, in a manner that may be helpful in understanding embodiments; however, the order of description should not be construed to imply that these operations are order-dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This disclosure is intended to cover any adaptations or variations of the embodiments discussed herein. Therefore, it is manifestly intended that embodiments of the disclosure be limited only by the claims and the equivalents thereof.

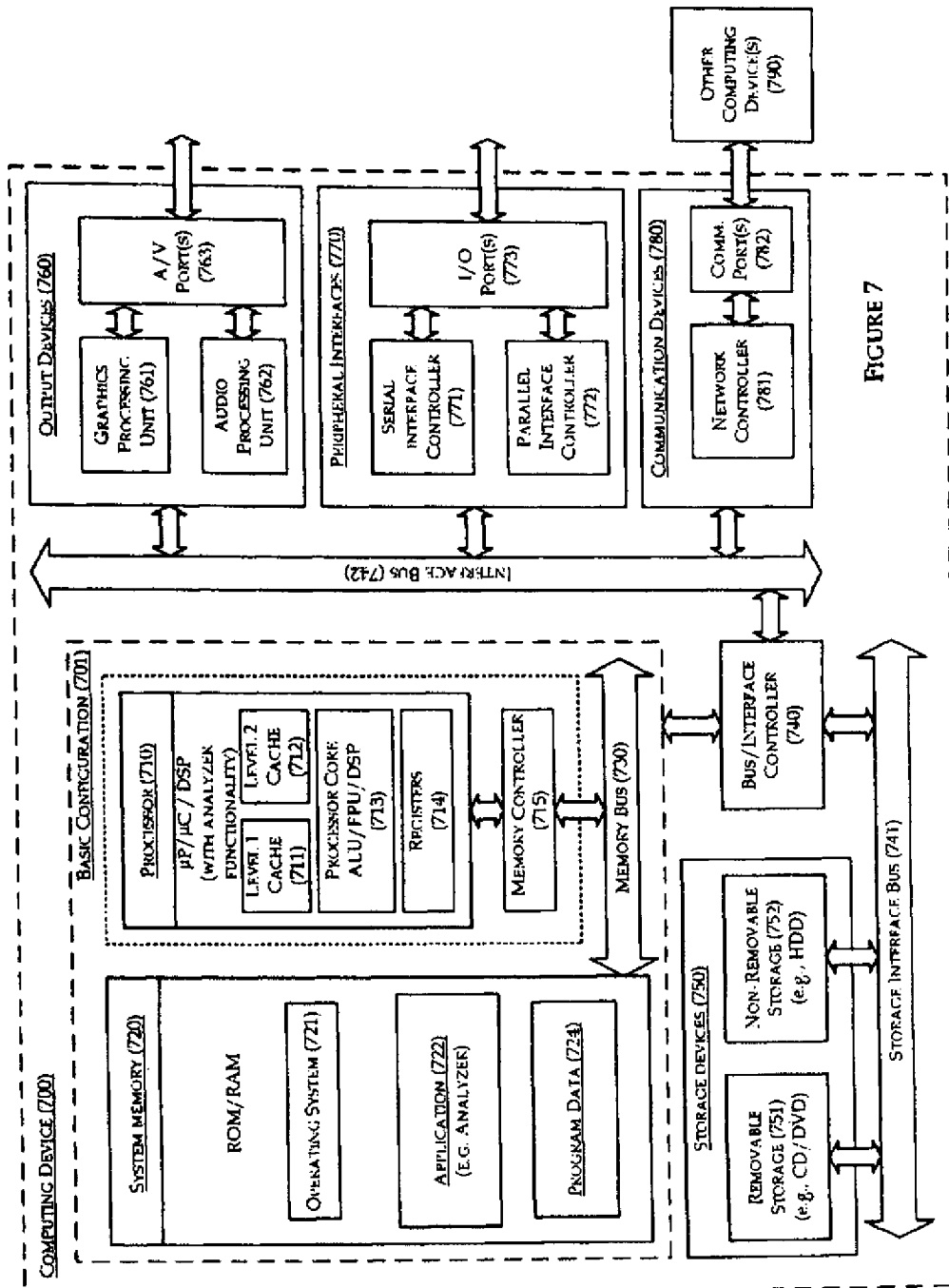

What is claimed is:

1. A method for testing security of a mapping function of an integrated circuit (IC), the method comprising:
   receiving, by an analyzer of a processor-enabled test system, from the mapping function, a plurality of sets of response bits, wherein each set of the plurality of sets of response bits corresponds to corresponding ones of a plurality of sets of challenge bits applied to the mapping function; and
   analyzing, by the analyzer, at least the plurality of sets of response bits to perform a predictability test, a sensitivity test, and an emulation test to determine a level of security vulnerability of the mapping function;
   wherein the analyzing of at least the plurality of sets of response bits to perform the predictability test comprises determining whether there is a predictable relationship between two or more of the plurality of sets of response bits, based at least on Hamming distances between their corresponding sets of challenge bits,
   wherein the analyzing of at least the plurality of sets of response bits to perform the sensitivity test comprises analyzing at least the plurality of sets of response bits to determine sensitivity of the mapping function to manufacturing variability of the IC, and
   wherein the analyzing of at least the plurality of sets of response bits to perform the emulation test comprises analyzing at least the plurality of sets of response bits to determine redundancies in challenge-response pairs (CRP).

2. The method of claim 1, wherein analyzing comprises determining a test metric indicative of the level of security vulnerability of the mapping function.

3. The method of claim 1, wherein each of the plurality of sets of response bits comprises a plurality of n response bit positions, wherein n is an integer, and wherein analyzing comprises grouping all response values of a particular response bit position of each of the plurality of sets of response bits, and determining an amount of deviation, wherein the amount of deviation comprises a difference between a baseline probability and a probability that any one of the grouped response values is a particular value.

4. The method of claim 3, wherein the baseline probability is 0.5.

5. The method of claim 1, wherein each of the plurality of sets of response bits comprises n response bit positions, wherein each of the plurality of sets of challenge bits comprises m challenge bit positions, and wherein analyzing comprises determining an amount of a deviation, from a baseline probability, of a probability of observing a transition in a particular bit position of the n response bit positions, based at least on either:
   transitions in response values of a subset of n response bit positions, wherein the subset differs from the particular bit position, or
   transitions in challenge values of one or more of the m challenge bit positions,
   wherein the baseline probability is 0.5.

6. The method of claim 1, wherein analyzing further comprises analyzing at least the plurality of sets of response bits to perform a collision test including determining a probability that any two sets, or subsets of any two sets, of response bits collide.

7. The method of claim 1, further comprising:
   inputting the plurality of sets of challenge bits into the mapping function during a first time frame;
   imposing a first environmental condition on the IC during the first time frame;
   imposing, during a second time frame, different from the first time frame, a second environmental condition on the IC, wherein the second environmental condition is different from the first environmental condition;

re-inputting during the second time frame, the plurality of sets of challenge bits; and receiving a plurality of other sets of response bits resulting from each of the sets of input challenge bits re-inputted during the second time frame;

wherein analyzing comprises determining whether there is a difference between the plurality of sets of response bits and the other plurality of other response bit sets.

8. The method of claim 1, wherein the mapping function is a Physically Unclonable Function (PUF) having a plurality of delay components selectively coupled together to form a plurality of path segments, and wherein the method further comprises characterizing one or more of the delay components or path segments, based at least on a structure of the PUF, the plurality of sets of challenge bits, and the plurality of sets of response bits, wherein characterizing includes characterizing at least a delay characteristic of the one or more delay components or path segments.

9. The method of claim 1, wherein each CRP comprises a set challenge bits, and a corresponding set of response bits, and wherein analyzing comprises determining at least a compressibility of the plurality of CRPs.

10. A system for testing security of a mapping function of an integrated circuit (IC), the system comprising:

test circuitry, configured to input a plurality of sets of challenge bits to the mapping function, and to receive a plurality of sets of response bits from the mapping function, wherein each set of response bits corresponds to corresponding ones of the sets of challenge bits; and an analyzer operably coupled to the test circuitry and configured to analyze at least the plurality of sets of response bits to perform a predictability test, a sensitivity test, and an emulation test, to determine a level of security vulnerability of the mapping function;

wherein the analyzer is configured to analyze at least the plurality of sets of response bits to perform the predictability test by determining whether there is a predictable relationship between two or more of the plurality of sets of response bits, based at least on Hamming distances between their corresponding sets of challenge bits, wherein the analyzer is configured to analyze at least the plurality of sets of response bits to perform the sensitivity test by analyzing at least the plurality of sets of response bits to determine sensitivity of the mapping function to manufacturing variability of the IC, and wherein the analyzer is configured to analyze at least the plurality of sets of response bits to perform the emulation test by analyzing at least the plurality of sets of response bits to determine redundancies in challenged-response pairs (CRPs).

11. The system of claim 10, wherein the analyzer is configured to determine, as part of said analyze, a test metric indicative of the level of security vulnerability of the mapping function.

12. The system of claim 10, wherein each of the plurality of sets of response bits comprises a plurality of n response bit positions, wherein n is an integer, and wherein the analyzer is configured to group all response values of a particular response bit position of each of the plurality of sets of response bits, and determine an amount of deviation, wherein the amount of deviation comprises a difference between a baseline probability and a probability that any one of the grouped response values is a particular value.

13. The system of claim 12, wherein the analyzer is configured to determine an amount of deviation from a baseline probability of 0.5.

14. The system of claim 10, wherein each of the plurality of sets of response bits comprises n response bit positions, wherein each of the plurality of sets of challenge bits comprises m challenge bit positions, and wherein the analyzer is configured to determine a predictability of one or more response values of one or more particular response bit positions based at least on either:

transitions in other response values of a subset of the n response bit positions; or transitions in challenge values of one or more of the m challenge bit positions.

15. The system of claim 10, wherein the analyzer is further configured to perform a collision test that includes determination of a probability that any two sets, or subsets of any two sets, of response bits collide.

16. The system of claim 10, wherein the test circuitry is configured to output the plurality of sets of challenge bits at a second time different from a first time that the test circuitry is configured to output the plurality of sets of challenge bits, and to receive, via the input circuitry, another plurality of other sets of response bits resulting from each of the sets of input challenge bits; and wherein the analyzer is further configured to determine whether there is a predictable difference between the plurality of sets of response bits and the other plurality of other response bit sets.

17. The system of claim 16, further comprising a temperature control element, configured to alter a temperature of the IC, and wherein the test circuitry is further configured to control the temperature control element to raise or lower the temperature such that a first temperature at the first time is different than a second temperature at the second time.

18. The system of claim 10, wherein the mapping function is a Physically Unclonable Function (PUF) having a plurality of delay components selectively coupled to form a plurality of path segments, and wherein the test circuitry is configured to determine delay characteristics of one or more of the delay components or path segments based at least on a structure of the PUF, the plurality of sets of challenge bits, and the plurality of sets of response bits, and to determine the level of security vulnerability based on the delay characteristics.

19. The system of claim 10, wherein each of the CRP comprises a set of challenge bits, along with a corresponding set of the plurality of response bits, wherein the analyzer is further configured to determine a compressibility of the plurality of CRPs.

20. A non-transitory computer-readable medium having instructions stored thereon that, when executed by a computing device, cause the computing device to:

receive a plurality of sets of response bits, each set of response bits corresponding to a response of a mapping function of an Integrated Circuit (IC) to individual ones of a plurality of sets of challenge bits input into the mapping function; and analyze at least the plurality of sets of response bits to perform a predictability test, a sensitivity test, and an emulation test to determine a level of security vulnerability of the mapping function;

wherein the analyzing of at least the plurality of sets of response bits to perform the predictability test comprises determining whether there is a predictable relationship between two or more of the plurality of sets of response bits, based at least on Hamming distances between their corresponding sets of challenge bits, wherein the analyzing of at least the plurality of sets of response bits to perform the sensitivity test comprises analyzing at least the plurality of sets of response bits to determine sensitivity of the mapping function to manufacturing variability of the IC, and wherein the analyzing of at least the plurality of sets of response bits to perform the emulation test comprises analyzing at least the plurality of sets of response bits to determine redundancies in challenge-response pairs (CRPs).

21. The non-transitory computer-readable medium of claim 20, wherein each of the plurality of sets of response bits comprises a plurality of n response bit positions, wherein n is an integer, and wherein the instructions, when executed by the computing device, cause the computing device to further:

group all response values of a particular response bit position of each of the plurality of sets of response bits;

determine whether the grouped response values have a probability of being a particular value that deviates from a baseline probability;

determine a predictability of one or more response values of one or more particular response bit positions based at least on either other response values of the n response bit positions, or challenge values of one or more of m challenge bit positions of the plurality of sets of challenge bits;

determine whether there is a predictable relationship between two or more of the plurality of sets of response bits, based at least on Hamming distances between their corresponding sets of challenge bits; and determine a probability that any two sets of response bits collide.

22. The non-transitory computer-readable medium of claim 20, wherein the instructions, when executed by the computing device, would cause the computing device to further:

receive another plurality of other sets of response bits resulting from an input of the plurality of sets of other input challenge bits under another environmental condition, wherein the other environmental condition is different from an environmental condition under which the plurality of sets of response bits are received; and determine whether there is a predictable difference between the plurality of sets of response bits and the other plurality of other response bits.

23. The non-transitory computer-readable medium of claim 20, wherein the mapping function comprises a Physically Unclonable Function (PUF) having a plurality of delay components selectively coupled to form a plurality of path segments, and wherein the instructions, when executed by the computing device, would cause the computing device to further determine delay characteristics of one or more of the delay components or path segments based at least on a structure of the PUF, the plurality of sets of challenge bits, and the plurality of sets of response bits.

24. The non-transitory computer-readable medium of claim 20, wherein each set of CRPs comprises a set of challenge bits, and a corresponding set of response bits, and wherein the instructions, when executed by the computing device, would cause the computing device to determine a compressibility of the plurality of CRPs.

25. A method for testing security of a simulated mapping function, the method comprising:

receiving, by an analyzer of a processor-enabled testing system, from the simulated mapping function, a plurality of sets of response bits, wherein each set of the plurality of sets of response bits corresponds to corresponding ones of a plurality of sets of challenge bits applied to the simulated mapping function; and analyzing, by the analyzer, at least the plurality of sets of response bits to perform a predictability test, a sensitivity test, and an emulation test to determine a level of security vulnerability of the simulated mapping function;

wherein the analyzing of at least the plurality of sets of response bits to perform the predictability test comprises determining whether there is a predictable relationship between two or more of the plurality of sets of response bits, based at least on Hamming distances between their corresponding sets of challenge bits, wherein the analyzing of at least the plurality of sets of response bits to perform the sensitivity test comprises analyzing at least the plurality of sets of response bits to determine sensitivity of the mapping function to manufacturing variability of the IC, and wherein the analyzing of at least the plurality of sets of response bits to perform the emulation test comprises analyzing at least the plurality of sets of response bits to determine redundancies in challenge-response pairs.

26. The method of claim 25, further comprising simulating a design of a mapping function to produce the simulated mapping function.

27. The method of claim 26, wherein the design of a mapping function is a design of a physically unclonable function.

* * * * *

UNITED STATES PATENT AND TRADEMARK OFFICE
CERTIFICATE OF CORRECTION

PATENT NO. : 8,370,787 B2  
APPLICATION NO. : 12/547382  
DATED : February 5, 2013  
INVENTOR(S) : Koushanfar et al.

Page 1 of 4

It is certified that error appears in the above-identified patent and that said Letters Patent is hereby corrected as shown below:

On Title Page 2, item (56), under "OTHER PUBLICATIONS", in Column 2, Line 16, delete "Pufs" and insert -- PUFs --, therefor.

On Title Page 2, item (56), under "OTHER PUBLICATIONS", in Column 2, Lines 28-29, delete "Uncloneable" and insert -- Unclonable --, therefor.

In the Drawings:

In Fig. 7, Sheet 7 of 8, below "PROCESSOR (710)", in Line 1, delete "UP / UC" and insert -- μP / μC --, therefor, as in attached Drawing Sheet.

In Fig. 7, Sheet 7 of 8, delete "  " and insert --  --, therefor, as in attached Drawing Sheet.

In Fig. 7, Sheet 7 of 8, in Box "(715)", in Line 1, delete "CONTROLER" and insert -- CONTROLLER --, therefor, as in attached Drawing Sheet.

In the Specification:

In Column 1, Line 40, delete "illustrates" and insert -- illustrates a --, therefor.

In Column 5, Lines 18-19, delete "detailed description." and insert -- Detailed Description. --, therefor.

In Column 9, Line 56, Equation (1), after Equation delete "." and insert -- , --, therefor.

In Column 9, Line 63, Equation (2), delete

Signed and Sealed this  
Twenty-fifth Day of February, 2014

Michelle K. Lee  
*Deputy Director of the United States Patent and Trademark Office*

CERTIFICATE OF CORRECTION (continued)
U.S. Pat. No. 8,370,787 B2

" $\rho_i^j = \bigoplus_{x=i,i+1,\ldots,j} c_x = c_i \oplus c_{=i+1} \oplus \ldots \oplus c_j$ " and insert -- $\rho_i^j = \bigoplus_{x=i,i+1,\ldots,j} c_x = c_i \oplus c_{=i+1} \oplus \ldots \oplus c_j$ . --, therefor.

In Column 10, Lines 20-24, Equation (3), delete

" $\Delta = \sum_{i=1}^{K}(-1)^{\rho_i^{K+K'}}\delta_i + (-1)^{\rho_{K+1}^{K+K'}}(y_{K+1} + \delta_{K+1}^*) + \sum_{i=K+2}^{K+K'}(-1)^{\rho_i^{K+K'}}\delta_i + \delta_{K+K'+1}$ " and insert -- $\Delta = \sum_{i=1}^{K}(-1)^{\rho_i^{K+K'}}\delta_i + (-1)^{\rho_{K+1}^{K+K'}}(y_{K+1} + \delta_{K+1}^*) + \sum_{i=K+2}^{K+K'}(-1)^{\rho_i^{K+K'}}\delta_i + \delta_{K+K'+1}$ --, therefor.

In Column 10, Lines 59-61, Equation (6), delete

" $\Delta = (-1)\rho_{K+1}^{K+K'-1}|\Delta_{first}| + (-1)^{c_{K+K'}}\left((-1)\rho_{K+1}^{K+K'-1}\delta_{K+1}^* + \Delta_{middle}\right) + y_{K+K'+1}$ " and insert -- $\Delta = (-1)\rho_{K+1}^{K+K'-1}|\Delta_{first}| + (-1)^{c_{K+K'}}\left((-1)\rho_{K+1}^{K+K'-1}\delta_{K+1}^* + \Delta_{middle}\right) + y_{K+K'+1}$ --, therefor.

In Column 11, Line 15, Equation (10), delete " $\Delta_{total} = \Delta \times (-1)^{\rho_{K+K'+1}^N} + \delta_{last}$ " and insert -- $\Delta_{total} = \Delta \times (-1)^{\rho_{K+K'+1}^N} + \delta_{last}$ --, therefor.

In Column 12, Line 36, delete "500" and insert -- 600 --, therefor.

In Column 13, Line 51, delete "NV" and insert -- A/V --, therefor.

CERTIFICATE OF CORRECTION (continued)
U.S. Pat. No. 8,370,787 B2

In the Claims:

In Column 16, Line 25, in Claim 1, delete "(CRP)." and insert -- (CRPs). --, therefor.

In Column 17, Line 1, in Claim 7, delete "re-inputting" and insert -- re-inputting, --, therefor.

In Column 17, Line 20, in Claim 9, delete "set" and insert -- sets --, therefor.

In Column 17, Lines 50-51, in Claim 10, delete "challenged-response" and insert -- challenge-response --, therefor.

In Column 20, Line 8, in Claim 24, delete "set" and insert -- sets --, therefor.

In Column 20, Line 40, in Claim 25, delete "pairs." and insert -- pairs (CRPs). --, therefor.